UNITED STATES PATENT OFFICE.

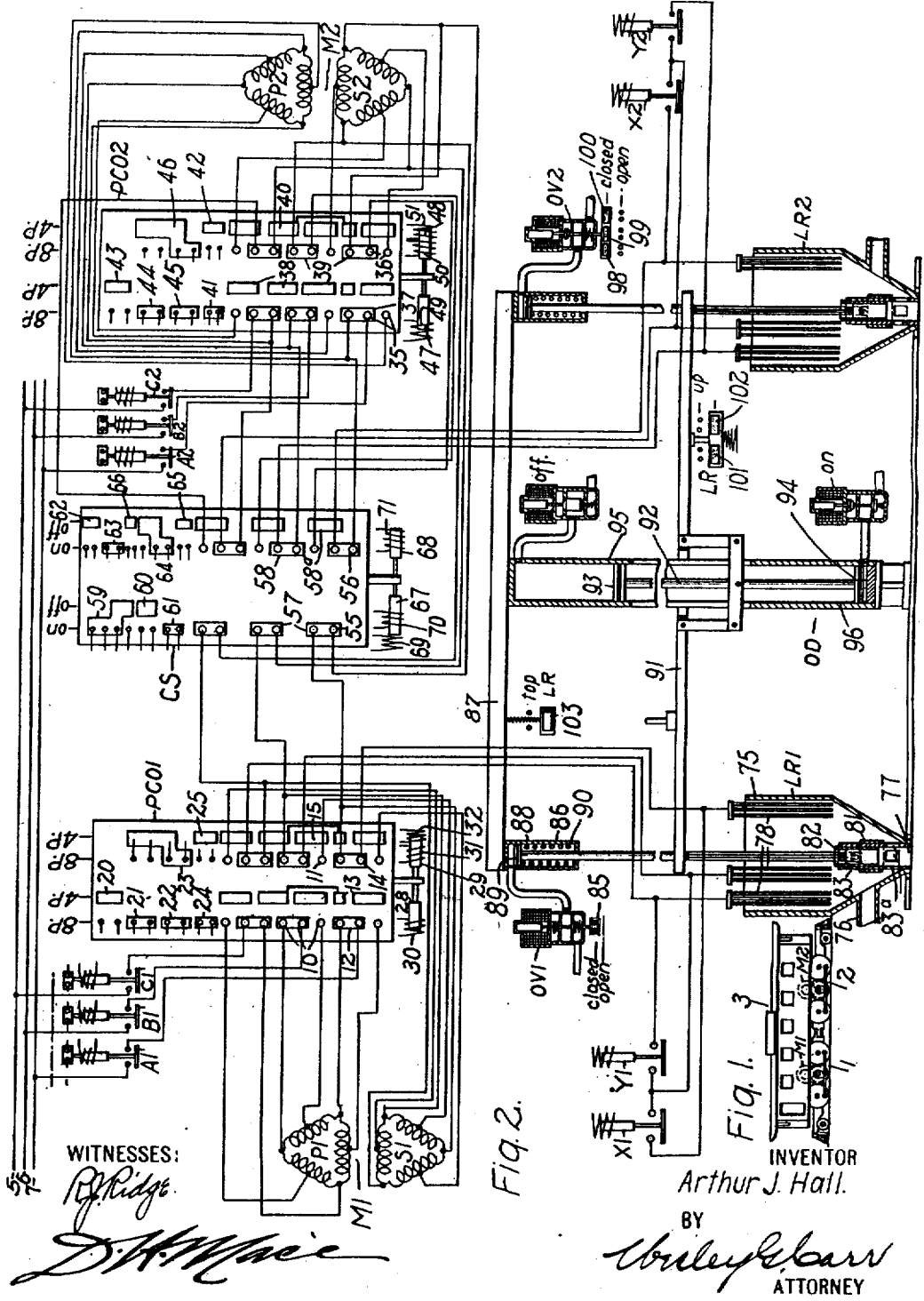

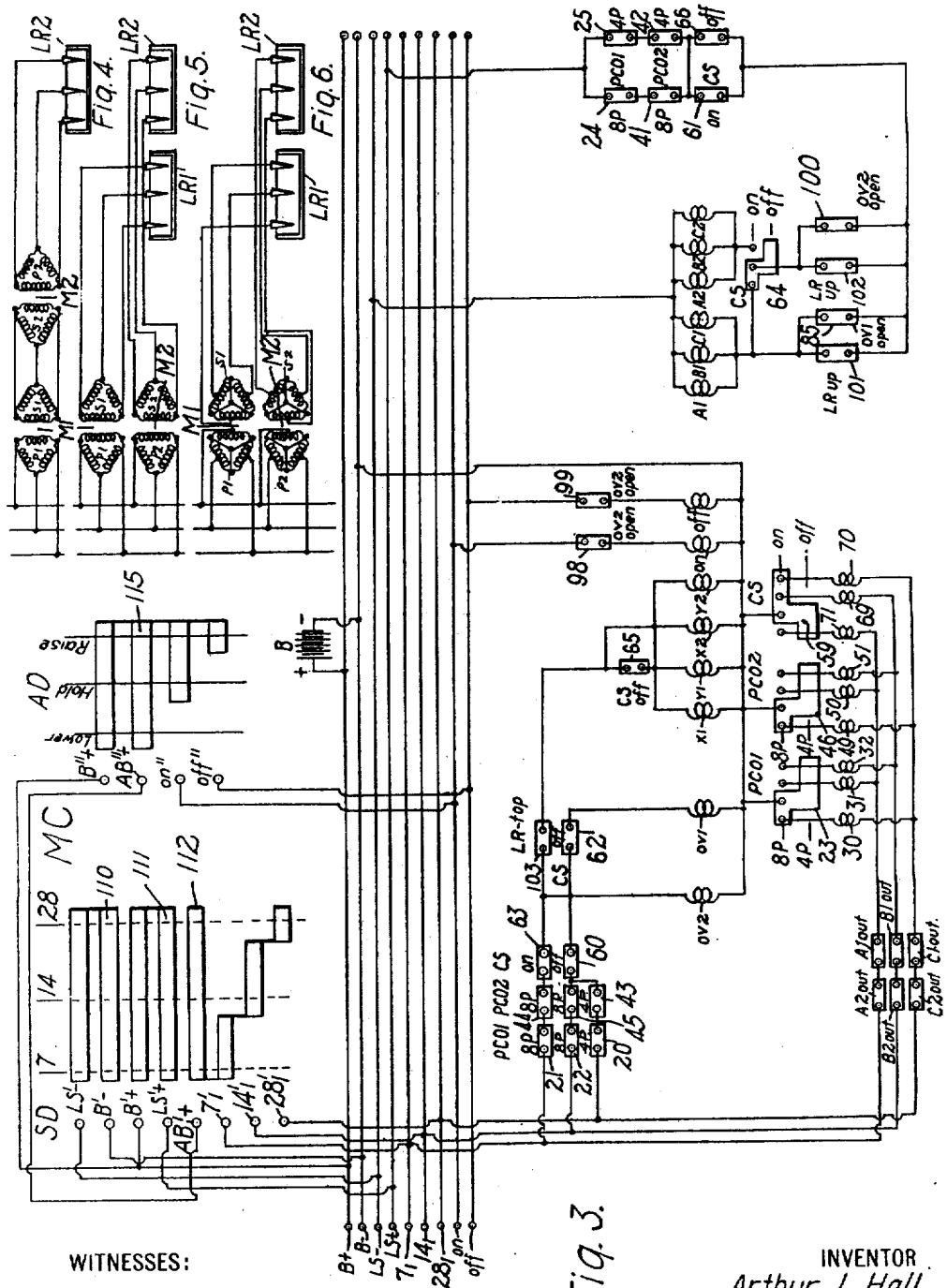

ARTHUR J. HALL, OF WILKINSBURG, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,241,507.     Specification of Letters Patent.     Patented Oct. 2, 1917.

Application filed September 8, 1914. Serial No. 860,607.

*To all whom it may concern:*

Be it known that I, ARTHUR J. HALL, a subject of the King of Great Britain, and a resident of Wilkinsburg, in the county of Allegheny and State of Pennsylvania, have invented a new and useful Improvement in Control Systems, of which the following is a specification.

My invention relates to control systems for dynamo-electric machines, and it has special reference to systems that are adapted to control the operation of electric locomotives or other railway vehicles that are propelled through the agency of polyphase induction motors which are governed by means of liquid rheostats.

One of the objects of my invention is to provide a system of control of the above indicated class which shall be simple in arrangement and effective in operation, and which may be installed and maintained at relatively low cost.

Another object of my invention is to provide a system of the multiple-unit type adapted for train operation by means of which a plurality of polyphase induction motors may be arranged for different ranges of speed and may be governed by a plurality of liquid rheostats throughout each speed range.

A further object of my invention is to provide a system of control for railway motors which shall be peculiarly adapted for the control of electric locomotives employed upon railway systems or electrified railroads having heavy grades and congested traffic, where severe service conditions are encountered and where economy of operation may be realized by the regeneration of energy to the distributing system on down grades or in stopping.

More specifically, an object of my invention is to provide a control system embodying a plurality of polyphase induction motors which may be adapted for different numbers of poles and for either cascade or parallel operation by means of a plurality of electrically operated speed-changing switches whereby several ranges of operating speeds are obtained, the acceleration of said motors for each speed range being governed through the agency of a pair of liquid rheostats that are electrically controlled by a master controller, in a manner known to the art.

It is another object of my invention to simplify and improve the arrangement of circuits and mode of operation of a system of control of the type set forth in a copending application, Serial No. 820,817, filed February 25, 1914, by Benjamin G. Lamme and assigned to the Westinghouse Electric & Manufacturing Company, and to provide adequate electrical means for actuating the switching devices and control apparatus and for controlling the operation thereof, and particularly to make provisions for interlocking the several correlated control devices, whereby a predetermined sequence of operation is insured and an improper order of operation is precluded. Thus, efficient and effective operation of the system is obtained without subjecting the apparatus to severe and damaging working conditions.

My invention may best be understood by reference to the accompanying drawings, in which Figure 1 is a view, in side elevation, of an electric locomotive for the control of which my system is adapted; Fig. 2 is a diagrammatic view of a system of control embodying my invention, the main circuit connections and apparatus and the control switches which are directly associated therewith being shown completely, while the control circuits are omitted for the sake of clearness; Fig. 3 is a diagrammatic view of the control circuit connections and control apparatus including the energizing coils and auxiliary interlocking switches shown in Fig. 2. The interlocking switches are distributed throughout the diagram for simplification and clearness in lieu of being indicated in connection with the apparatus with which they are actually associated and by which they are actuated. By so doing, it is believed that a more ready understanding of the system and its mode of operation may be had, while unnecessary complications in the circuit connections are avoided. Figs. 4, 5, and 6 are simplified diagramamtic views, showing the arrangement of main-circuit connections of the motors for three different ranges of speeds.

I shall first set forth the main-circuit connections and apparatus and the general mode of operation thereof, after which the control-circuit connections and operation will be discussed.

Referring to the drawings, the system shown is adapted for the control of a plurality of driving motors M1 and M2 that may be respectively associated with a plurality of driving trucks 1 and 2 of an electric locomotive 3 and which, of course, is applicable to different arrangements of motors, irrespective of the class of vehicles with which they are associated. The system comprises a plurality of supply-circuit conductors 5, 6 and 7 which are adapted to deliver polyphase alternating energy to the polyphase induction motors M1 and M2; a plurality of line switches A1, B1, and C1 for connecting the supply conductors 5, 6 and 7 to motor M1; a plurality of line switches A2, B2 and C2 interposed between the supply-circuit conductors and the motor M2; pole change-over switches PCO1 and PCO2 for arranging the winding connections of the motors M1 and M2 for different numbers of poles; a cascade switch CS for connecting motors M1 and M2, either in cascade relation or in parallel circuit relation; a plurality of liquid rheostats LR1 and LR2 adapted to be connected in the secondary circuits of the motors M1 and M2 for governing the acceleration and operation thereof; an operating device OD for actuating the liquid rheostats LR1 and LR2; a plurality of switches X1 and Y1 for short-circuiting rheostat LR1, and switches X2 and Y2 for establishing short-circuit connections for liquid rheostat LR2.

The motors M1 and M2 are of the three-phase wound-rotor induction type and respectively embody primary windings P1 and P2 and secondary windings S1 and S2. Initially, the windings are connected in delta relation, and the external connections are made to the points of common connection, under which conditions, the motors are adapted for a particular number of poles, for instance, eight poles, while the windings are provided with taps at substantially their mid-points, by means of which the number of poles of the motors may be halved if desired, thereby producing four-pole machines. Inasmuch as these connections for adapting motors of this type for different numbers of poles are well-known, no further description thereof is deemed necessary.

The pole change-over switch PCO1 comprises a plurality of sets of main stationary contact terminals 10 and 11 and coöperating sets 12, 13, 14 and 15 of movable contact segments which are adapted to make engagement therewith upon the position-indicating lines 8P and 4P, the change-over switch being adapted to occupy two positions, one for arranging the motor M1 for eight poles and the other for four poles. The switch PCO1 embodies also a plurality of interlocking switches 20, 21, 22, 23, 24 and 25 which comprise coöperating relatively movable contact terminals that are also adapted for engagement upon the position-indicating lines, hereinbefore referred to.

Each of the several interlock switches will be designated by a single reference numeral which indicates the movable conducting segment thereof, and for the sake of clearness, said switches will be hereinafter referred to by their numerals with the reference character of the main switch with which they are associated and by the position of said switch in which engagement between the coöperating members is effected. For instance, 23—PCO1—8P indicates that conducting segment 23 of pole change-over switch PCO1 engages its stationary contact terminals when said change-over switch occupies its position 8P.

The switch PCO1 is adapted to be electrically operated by means of electromagnets 28 and 29, electromagnet 28 being provided with a single energizing coil 30—PCO1—4P, and magnet 29 with a plurality of coils 31—PCO1—8P and 32—PCO1—8P.

The pole change-over switch PCO2 is similar in construction to switch PCO1 and embodies a plurality of sets of main stationary contact terminals 35 and 36, coöperating sets 37, 38, 39 and 40 of movable conducting segments, a plurality of interlock switches 41, 42, 43, 44, 45, and 46, and a plurality of operating electromagnets 47 and 48, which, respectively, are provided with energizing coils 49—PCO2—4P, 50—PCO2—8P and 51—PCO2—8P.

The cascade switch CS is also of similar construction to those just described and embodies a plurality of sets 55 and 56 of main stationary contact terminals, sets 57, 58 and 58ª of coöperating movable segments, a plurality of interlock switches 59, 60, 61, 62, 63, 64, 65 and 66 and electromagnets 67 and 68, respectively, provided with energizing coils 69—CS—*off*, 70—CS—*off* and 71—CS—*on*.

The liquid rheostat LR1 comprises a tank 75 having an inlet opening 76 through which electrolyte continuously flows, a discharge opening 77 and a plurality of electrodes 78. Associated with the discharge opening 77 are a plurality of concentrically related valves 81 and 82. The discharge valve 81 surrounds a tubular member 83 which is secured to the inner edges of the discharge opening 77 and is provided with a plurality of openings 83ª near its lower end, and said discharge valve 81 is adapted to be moved downwardly to close said openings 83ª. The valve 82 is the regulating valve and is slidably fitted within the tube 83 and is adapted to be raised or lowered to affect the height of the electrolyte within the rheostat, it being understood that the electrolyte is being continuously admitted into the rheostat and that the excess thereof, when the discharge valve is closed, overflows through said regulating valve 82 and the discharge opening 77. The discharge valve 81 is mechanically associated with a pneumatic operating device 86 which is conveniently supported by a member 87.

The operating device 86 comprises a cylinder 88 containing a movable piston 89 which is normally held in its upper position by a spring 90. An electrically operated outlet valve OV1 governs the admission of fluid thereto from a suitable source (not shown) and is provided with an interlock switch 85. The valve OV1, when deënergized, is closed and cuts off the supply of operating fluid while establishing a communication between the cylinder 86 and the atmosphere, whereby its associated discharge valve 81 is held open.

Since the liquid rheostat LR2 is similar in all respects to the rheostat LR1, no description thereof will be given. The associated outlet valve OV2 is adapted to control the actuation of the discharge valve 81 of rheostat LR2, in the same manner as set forth in connection with rheostat LR1, and is provided with interlock switches 98, 99 and 100.

The regulating valves 82 of rheostats LR1 and LR2 are mechanically associated with the operating device OD, being connected to the ends of a common supporting member or arm 91 that is associated with a piston rod 92 having end pistons 93 and 94, which are movable within a plurality of operating cylinders 95 and 96, respectively. The lower end of operating cylinder 96 is provided with an electrically operated valve marked "On" which, when deënergized, establishes communication between the cylinder 96 and the atmosphere and, when energized, admits operating fluid thereto. An electrically operated valve marked "Off" is connected to the upper end of cylinder 95 and, when deënergized, is open to admit operating fluid into said cylinder. Under normal operating conditions, therefore, when both the "On" and "Off" magnet valves are deënergized, pressure is released beneath the piston 94 and is admitted above the piston 93, whereby the regulating valves 82 of the several rheostats LR1 and LR2 are biased to and maintained in their lowest positions. When both magnet valves are energized, the reverse conditions are obtained, and the regulating valves 82 are moved upwardly. When only the "On" magnet valve is energized, balanced pressures are obtained on the opposite sides of the pistons 93 and 94, and the mechanism is maintained at rest. The operating device OD, as a whole, is termed a "balanced-pressure operating device".

Associated with the operating device OD, are a plurality of interlock switches 101—LR—*up* and 102—LR—*up* to coöperate with the cross arm 91 which operates the regulating valves 82, and said interlock switches are normally opened when the regulating valves 82 and the arm 91 are in their lowest positions and are subsequently closed by suitable means as soon as the cross arm 91 is initially raised. Another auxiliary interlock switch 103—LR—*top* is associated with the operating device OD and is arranged to be closed only when the cross arm 91 and associated regulating valves 82 are raised to their uppermost or top positions. The interlock switches associated with the outlet valves OV1 and OV2 are opened when their associated valves are deënergized and closed when their respective valves are energized and opened. Hereinafter, the several interlock switches referred to will be designated by their reference numerals together with the valve with which they are associated and the position of the valve in which the switch is closed, as, for instance, interlock switch 100—OV2—*open*.

Having set forth the arrangement of apparatus and the structural details thereof, I shall now describe, in a general way, the main circuit connections, irrespective of the manner by which and in which said apparatus is actuated and controlled.

Assuming the main circuit connections to be as shown in Fig. 2, the motors M1 and M2 are connected in cascade arrangement, with the secondary winding S2 of motor M2 connected to the secondary windings S1 of motor M1 and the primary windings P2 of motor M2 connected to the rheostat LR2. Moreover, the windings of the several motors are connected for their larger number of poles, namely, eight poles, and hence, this cascade arrangement gives the equivalent of a sixteen-pole machine, so far as the speed of operation is concerned. This constitutes the lowest-speed connection, which, it will be assumed, is adapted to produce a speed of approximately seven miles per hour.

In the co-pending application hereinbefore referred to, the pole change-over switches PCO1 and PCO2 and the cascade switch CS and their circuit connections and mode of operation are fully described and, therefore, I shall not attempt to give a detailed description thereof nor to trace the main circuits which are manipulated thereby. The switches PCO1, PCO2 and CS are similar to the corresponding switches in the application to which reference has been made, except that they are provided with several auxiliary interlock switches and are operated electrically by means of suitable electromagnets.

Having established the cascade connections of motors M1 and M2, outlet valve OV2 is energized to effect the closure of the discharge valve 81 of rheostat LR2, under which condition the continuous flow of electrolyte into the rheostat raises the height thereof to the "flush level", at which height the electrodes 78 are partially immersed and the excess of electrolyte overflows. Subsequent to the action of the outlet valve OV2 and before the "flush level" is established, the line switches A1, B1 and C1 are closed to connect the supply line conductors 5, 6 and 7 to the primary windings P1 of motor M1. The motor-circuit connections are then as shown in Fig. 4.

The source of energy being thus connected to the motors, said motors are started into operation and may be accelerated by gradually raising the level of the electrolyte within the rheostat LR2, whereby the resistance in the secondary windings S2 of motor M2 is gradually excluded. The elevation of the electrolyte is, of course, effected by raising the regulating valve 82 through the balanced-pressure operating device OD, it being understood that said device is caused to actuate said valve by energizing the "off" and the "on" magnet valves, whereby operating fluid is admitted beneath piston 94 and released above piston 93. The movement of the valve 82, and hence motor acceleration, may be arrested by deënergizing the "off" valve, whereby balanced pressures, acting upon the pistons 93 and 94, are obtained.

Having raised the electrolyte to its maximum height, all the resistance is excluded from the secondary circuit of motor M2, and the short-circuiting switches X2 and Y2 are closed. The full-speed operation for this particular connection of motors is thus obtained, namely, seven miles per hour, and this is the first running position of the motors.

In order to increase the motor speed, the valve OV2 is deënergized to permit the opening of the discharge valve 81 of the rheostat LR2. The "off" and "on" magnet valves are also deënergized to permit the balanced-pressure operating device OD and its associated regulating valves to be lowered to their initial positions, whereby the liquid rheostat LR2 serves to interrupt the motor circuit, after which line switches A1, B1 and C1 are opened.

Maintaining the pole change-over switches PCO1 and PCO2 in the same positions, the cascade switch CS is moved to its "off" position, whereby the motors M1 and M2 are connected in parallel and arranged for their larger number of poles, namely, eight poles. The outlet valves OV1 and OV2 are then energized to effect the closure of the discharge valves 81 of the rheostats LR1 and LR2, whereby the "flush levels" of the electrolyte are established. Prior thereto, however, line switches A1, B1 and C1 and A2, B2 and C2 are closed. Thus, energy is supplied to the motors M1 and M2, which are connected in parallel and independently to rheostats LR1 and LR2, the motor circuit connections being as shown in Fig. 5.

To increase the motor speed, the operating device OD is actuated to raise the regulating valves 82, whereby the electrolyte level is increased and the motor secondary resistances correspondingly decreased until the maximum height of the electrolyte is reached, when the short-circuiting switches X1, Y1 and X2 and Y2 are closed. The motors M1 and M2 are then connected in multiple to the supply circuit, with their larger number of poles, namely, eight poles. This is the second running position of the motors, and the speed thereof is substantially double that of the first arrangement of motor-circuit connections, namely, fourteen miles per hour.

A still further range of operating speeds may be obtained by again emptying the rheostats LR1 and LR2 of electrolyte and subsequently opening the several line switches, as hereinbefore described, after which the pole change-over switches PCO1 and PCO2 are moved into their four-pole positions 4P, whereby the windings of motors M1 and M2 are re-arranged to halve the number of poles, thus producing four-pole machines. The cascade switch CS remains in its "off" position, whereby the multiple arrangement of the motors M1 and M2 is maintained.

Subsequent to arranging the motors for multiple operation and four-pole windings, the outlet valves OV1 and OV2 and the line switches A1, B1, C1 and A2, B2 and C2 are actuated in the manner already set forth. The motor connections are then as shown in Fig. 6. Energy is thus supplied to the motors M1 and M2, and they may be brought up to speed by raising the level of the electrolyte within the rheostats LR1 and LR2 until the maximum heights are reached, when the short-circuit switches X1, Y1 and X2 and Y2 are closed. Under these conditions, the motors M1 and M2 are connected in multiple arrangement with four-poles, each with all their secondary resistance excluded. This is the third or full running-speed condition and is adapted to effect a speed of twenty-eight miles per hour.

It will be seen, therefore, that the motors may be arranged for three ranges of operating speeds; first, from zero to seven miles an hour, with eight-pole windings and cascade arrangement; second, from seven, to fourteen miles an hour, with eight-pole windings and multiple arrangement; and third, from fourteen to twenty-eight miles an hour, with four-pole windings and multiple arrangement.

Having considered, in a general way, the main motor-circuit connections and the mode of operation, reference may be had particularly to Fig. 3 showing the auxiliary control-circuit connections which will now be discussed.

Among the control apparatus, is a master controller MC comprising two parts, a so called "speed drum" SD and an "acceleration drum" AD. The speed drum SD comprises a plurality of stationary contact terminals LS'—, B'—, B'+, LS'+, AB'+, 7'₁, 14'₁ and 28'₁ which are adapted to engage a plurality of movable conducting segments 110, 111 and 112 upon the position-indicating lines 7, 14 and 28, corresponding to the several speed connections, namely, seven, fourteen and twenty-eight miles per hour, whereby the motor-circuit connections are arranged for the different ranges of operating speeds.

The acceleration drum AD comprises a plurality of stationary contact terminals B"+, AB"+, *on"* and *off"*, which are adapted for coöperative engagement with a movable conducting segment 115 upon the position-indicating lines marked "Lower", "Hold" and "Raise", whereby the action of the operating device OD that actuates the liquid rheostats may be governed at the will of the operator.

In order to adapt the system for multiple unit train operation, a plurality of train line conductors B+, B—, LS—, LS+, 7₁, 14₁, 28₁, *on"* and *off"* are employed, and are severally electrically connected to the contact terminals of the speed drum SD and acceleration drum AD bearing corresponding reference characters.

Assuming the apparatus and circuit connections to be as shown in Figs. 2 and 3, the operation of the system is as follows: The speed drum SD is first moved into its position 7, while the acceleration drum AD is preferably caused to occupy one of its operating positions marked "Lower", whereby the motor-circuit connections are established for the first range of operating speeds, as shown in Fig. 4. In position 7, a circuit is completed, from the positive side of the battery B which includes train line conductor B+, contact terminals B"+ and AB"+, which are bridged by the acceleration drum conducting segment 115, contact terminals AB'+ and 7'₁, which are bridged by a conducting segment 112 of the speed drum SD, train line conductor 7₁ and, providing the several pole change-over switches and cascade switch occupy their proper positions for effecting a cascade arrangement of motor with 8 pole arrangements, a circuit is completed through interlock switches 21—PCO1—8P, 44—PCO2—8P, 63—CS—*on*, and thence, through energizing coil of outlet valve OV2, to the negative side of battery B. The outlet valve OV2, being thus energized, is actuated to effect the closure of discharge valve 81 of liquid rheostat LR2, and, in so doing, its associated interlock switch 100—OV2—*open* is closed. Thus, a circuit is completed from train line conductor B+ which includes contact terminal B'+, conducting segment 111, contact terminal LS'+, train line conductor LS+, interlock switches 24—PCO1—8P, 41—PCO2—8P, 61—CS—*on*, 100—OV2—*open*, 64—CS—*on*, and line switches A1, B1 and C1 to train line conductor LS— where the circuit is completed, through contact terminal LS'— and B'— which are bridged by conducting segment 110 of the speed drum SD to the negative side of the battery B. The energization of the coils of line switches A1, B1 and C1 effects their closure and connects the supply-circuit conductors 5, 6 and 7 to the primary windings P1 of motor M1. It will be noted that interlock switches 24, 41 and 61 of the respective speed-changing switches serve to insure that these switching devices occupy their full operative positions before the line switches can be closed, thus preventing the connection of the motors to the supply circuit in the event that some one of the speed-changing devices is out of order and is restrained in an inoperative position. Moreover, the interlock switch 64—CS—*on* prevents the closure of line switches A2, B2 and C2 during the cascade operation of the motors.

Having closed the discharge valve 82 of rheostat LR2, the continuously flowing electrolyte rapidly rises in the rheostat until the tips of the electrodes 78 are immersed which is effected when the electrolyte is raised to the "flush-level". The time interval required for establishing the "flush-level" is sufficiently long to enable the closure of the line switches A1, B1 and C1 so that, as soon as the electrolyte is brought into contact with the tips of the electrodes, the motor-circuit connections are established.

In order to start the motor into operation, the acceleration drum AD is moved into its "raise" position, whereby a circuit is established from contact terminal B"+ to include conducting segment 115, contact terminal *on"*, train line conductor *on*, interlock switch 98—OV2—*open* and an energizing coil of the "on" magnet valve to the negative side of battery B. Another circuit is also established from the contact terminal B"+ through conducting segment 115, contact terminal *off"*, train line conductor *off*, interlock switch 99—OV2—*open* and energizing coil of the "off" magnet valve to the negative side of the battery.

Having energized the "off" and "on" magnet valves, said valves are actuated to respectively release the pressure from above the piston 93 of the operating device OD and to admit operating fluid beneath the piston 94 thereof, whereby unbalanced pressure conditions obtain, and the regulating valve 82 of rheostat LR2 is raised into position. Obviously, as the regulating valve 82 is elevated, the level of the electrolyte within the rheostat LR2 is raised, inasmuch as it is continuously admitted thereto. Hence, the motors M1 and M2 are gradually accelerated as the secondary resistance of motor M2 is gradually reduced.

In case the desired speed is obtained, the operator has merely to move the accelerating drum AD to its "hold" position, whereby stationary terminal *off* becomes disengaged from conducting segment 115 and the "off" magnet valve is deenergized and permitted to open. In so doing, fluid pressure is admitted to the upper cylinder 95 of the operating device OD and balanced pressure conditions are obtained, which serve to arrest further movement of the regulating valve 82. If desired, the motor speed may be decreased by moving the acceleration drum AD into its "lower" position, in which contact terminal *on* is also disengaged from contact segment 115, whereby the "on" magnet valve is also deenergized and permitted to close. Under these conditions, the lower cylinder 96 is exhausted sufficiently to establish unbalanced pressure relations tending to cause the movable parts of device OD to be forced downwardly, whereby the regulating valve 82 of rheostat LR2 is lowered. The electrolyte level therefore is correspondingly lowered and the motor speed reduced.

Assuming that the acceleration drum AD occupies its "raise" position, the upward movement of the operating device OD and the regulating valve 82 continues until the maximum height is reached. When the arm 91 of the operating device OD attains its uppermost position, or just prior thereto, it engages interlock switch 103—LR—*top*, and effects the closure thereof. Thereupon, a circuit is completed from the negative side of interlock switch 63—CS—*on*, which includes interlock switch 103—LR—*top* and energizing coils of the short-circuit switches X2 and Y2, to the negative side of the battery. These switches are, therefore, energized and closed to establish short-circuit connections between the several electrodes 78 of the rheostat LR2, while interlock switch 65—CS—*off* prevents the actuation of the short-circuit switches X1 and Y1 during cascade operation, inasmuch as the cascade switch CS occupies its "on" position.

In order to further increase the motor speed, it is necessary to re-arrange the connections of the motors M1 and M2, and, hence, the speed drum SD is moved to its position 14. During this movement, the contact terminal $7'_1$ becomes disengaged from conducting segment 112, thereby deenergizing outlet valve OV2 and short-circuiting switches X2 and Y2. Hence, the discharge valve 82 of rheostat LR2 is opened to permit the discharge of electrolyte therethrough, while the several interlock switches associated with the valve OV2 are caused to interrupt their control circuits. The short-circuit switches X2 and Y2 are also deenergized and opened. As the interlock switches 98—OV2—*open* and 99—OV2—*open* interrupt the energizing circuits of the respective "on" and "off" magnet valves, said valves are returned to their initial positions, whereby, unbalanced pressures are obtained which act upon the movable parts of the operating device OD to return them and their associated regulating valves 82 to their lowermost positions. During the lowering of the regulating valves 82, the interlock switch 102—LR—*up* is maintained closed until the operating device OD reaches substantially its lowermost position. Therefore, the line switches A1, B1 and C1 are held closed until the interlock switch, just referred to, is opened by reason of engagement of arm 91 therewith in its lowest position.

Concurrently with the lowering of the operating device OD and regulating valve 82, the electrolyte within the rheostat LR2 is being rapidly discharged, which action is completed before the regulating valve 82 is completely lowered and the line switches A1, B1 and C1 opened. Therefore, the interruption of the motor circuits is effected by the electrolyte within the rheostat, and the line switches merely serve to subsequently disconnect the motor from the supply circuits.

As soon as the line switches are opened, a circuit is completed from speed drum contact terminal $AB'$+ through conducting segment 112, contact terminal $14'_1$, train line conductor $14_1$, interlock switches B2—*out* and B1—*out*, energizing coil 69—CS—*on* and interlock switch 59—CS—*on* to the negative side of the battery. The cascade switch CS, therefore, is actuated to its "off" position, whereby the motors M1 and M2 are connected in multiple relation, and the cascade arrangement thereof is discontinued. No changes are effected in the arrangement of the motor windings and, therefore, the motors are still connected for eight poles.

Upon the movement of the cascade switch CS to its "off" position, a circuit is completed from the train line conductor $14_1$, through interlock switches 22—PCO1—8P, 45—PCO2—8P, 60—CS—*off*, and energizing coil of outlet valve OV2 to the B— train line conductor. The establishment of the circuit just traced effects the actuation of the valve OV2, whereby the discharge valve 81 of rheostat LR2 is closed. The discharge valve of rheostat LR1 is also closed concurrently therewith, inasmuch as outlet valve OV1 is simultaneously energized through interlock switch 62—CS—*off*.

The energization of valves OV1 and OV2 causes the closure of interlock switches 85—OV1—*open*, 100—OV2—*open* whereby a circuit is completed from train line conductor LS+ through interlock switches 24—PCO1—8P, 41—PCO2—8P, and 66—CS—*off*, where the circuit divides, one branch traversing interlock switch 85—OV1—*open* and the energized coils of line switches A1, B1 and C1 to train line conductor LS—, and the other branch including interlock switches 100—OV2—*open*, and 64—CS—*off* and energizing coil of line switch A2, B2 and C2 to the LS— train line conductor. The several line switches A1, B1, C1 and A2, B2 and C2 are, therefore, energized and closed to connect the several motors M1 and M2 in parallel relation to the supply circuit conductors 5, 6, and 7, as shown in Fig. 5. During the closure of the line switches, the continuously inflowing electrolyte establishes the "flush-levels" and starts the motors into operation.

The energization of outlet valve OV2 effects the closure of interlock switches 98—OV2—*open* and 99—OV2—*open*, and, inasmuch as the accelerating drum AD still occupies its "raise" position, the magnet valves "on" and "off" are energized. Consequently, the operating device OD is caused to raise the several regulating valves 82 of the rheostats LR1 and LR2.

As already set forth, the initial movement of the arm 91 permits the closure of interlock switches 101—LR—*up* and 102—LR—*up* whereby the energizing circuits of the line switches are maintained until the regulating valves 82 are again lowered to their initial position.

Manifestly, the level of the electrolyte within the rheostats LR1 and LR2 may be governed at the will of the operator by moving the accelerating drum AD into the proper positions. The speed of the motors, therefore, is at all times under control. No description of the manipulation of the accelerating drum AD and corresponding operation of the operating device OD and rheostats LR1 and LR2 will be given, inasmuch as the functioning of the apparatus is similar to that already described in connection with the cascade arrangement of the motors.

Assuming the accelerating drum AD to be maintained in its "raise" position, the several regulating valves 82 of the rheostats LR1 and LR2 are gradually raised until their maximum positions are reached. Just prior thereto, interlock switch 103—LR—*top* is closed by reason of the engagement of the arm 91 therewith, and thus, a circuit is completed from the negative side of interlock switch 60—CS—*off* through interlock switch 103—LR—*top* where the circuit divides, one branch traversing the energizing coils of short-circuit switches X2 and Y2 to the B— train line conductor and the other branch traversing interlock switch 65—CS—*off* and energizing coils of short-circuiting switches X1 and Y1. Said switches, therefore, are actuated and closed to short-circuit the several rheostats when they have performed their functions of completely eliminating the motor-secondary resistances.

If it is desired to further increase the motor speed, the speed drum SD is moved to position 28, contact terminal 14'$_1$ being thus disengaged from conducting segment 112, whereby the short-circuit switches X1, Y1, X2 and Y2, and outlet valves OV1 and OV2 are deënergized and are caused to return to their initial positions. The deënergization of outlet valve OV2 causes the interlock switches 98—OV2—*open* and 99—OV2—*open* to interrupt the energizing circuits of the "on" and "off" magnet valves, whereby the operating device OD and associated regulating valves 82 of the several rheostats are moved to their lowest positions, while the electrolyte within the rheostats is being discharged through the opening of the discharge valves. The motor circuit connections are thus interrupted through the electrolyte within the rheostats during the transition from one motor-speed connection to another. As soon as the regulating valves 82 reach their initial positions the interlocking switches 101—LR—*up*, and 102—LR—*up* are disengaged and caused to deënergize the several line switches which open to disconnect the motor from the supply circuits.

Immediately following the opening of the line switches, a circuit is established from the speed drum SD through contact terminal 28'$_1$, train line conductor 28$_1$, interlock switches C2—*out* and C1—*out* and thence, in parallel, through one branch including energizing coil 30—PCO1—8P to the battery and through energizing coil 49—PCO2—8P to the battery. The pole change-over switches PCO1 and PCO2, therefore, are actuated into their 4P positions, whereby the motor windings are reconnected and arranged for four poles. The cascade switch CS remains in its "off" position so that the motors M1 and M2 are connected in multiple relation, with four poles instead of eight poles.

As soon as the switches PCO1 and PCO2 occupy their 4P positions, a circuit is established from train line conductor 28$_1$ which includes interlock switches 20—PCO1—4P, 43—PCO2—4P and 60—CS—*off* and thence, through the energizing coils of outlet valves OV1 and OV2, in multiple, to the battery, interlock switch 62—CS—*off* being closed to complete the circuit through the coil of valve OV1. The several discharge valves 81 of the rheostats LR1 and LR2 are, therefore, closed and the electrolyte rises rapidly within the rheostats to establish the "flush-levels."

Inasmuch as the rest of the operation and circuit connections are similar to those already described in connection with the second-speed position 14 of the speed drum SD, no further description thereof is deemed necessary.

It will be understood, however, that, as soon as the valves OV1 and OV2 are open, their associated interlock switches close to initiate the operation of the operating device OD and to effect the closure of the line switches A1, B1 and C1 and A2, B2 and C2. Having established the motor circuit connections for the third running speed, or the 28 position of the speed drum, as shown in Fig. 6, the further control of the motors by means of the accelerating drum AD may be governed in accordance with the will of the operator, as already described in detail.

The operation of the system may be discontinued at any time by moving the speed drum SD or the acceleration drum AD to their respective "off" positions, this movement of the acceleration drum serving to interrupt the motor circuits by the insertion of resistance into the secondary windings and finally interrupting through the electrolyte, as is accomplished through transitions from one speed connection to another, and the movement of the speed drum effecting the interruption of the motor circuits through the opening of the line switches.

In order to decrease the speed of the motors M1 and M2 from one of the higher-speed positions of the speed drum SD, the operation is substantially like that described heretofore and merely necessitates the manipulation of the speed drum SD to the desired lower-speed position, which causes the electrolyte to be emptied from the rheostats, the line switches to be opened, the pole change-over and cascade switches to be moved to their proper positions, and subsequently the motors reconnected to the source and the operation resumed, during which action, energy is regenerated to the supply circuits so long as the motor speed is in excess of the synchronous speed corresponding to the particular motor connections.

This system of control is particularly adapted for the utilization of driving motors M1 and M2 as generators, being driven by the inertia of the vehicle or locomotive for the regeneration of energy to the source. The regenerative action of the motors may be effected at any time when the speed thereof is greater than the normal speed of the motors corresponding to the particular arrangement of motors and circuit connections established. If, therefore, the motors are running at substantially twenty-eight miles per hour and it is desired to retard or stop by breaking dynamically, the speed drum SD may be moved to its second position 14 which establishes the motor connections for the fourteen mile per hour operation, whereby regeneration of energy is effected until the speed has been reduced to substantially fourteen miles per hour. During the regeneration the operation of the liquid rheostats is identical with that hereinbefore described, that is, the rheostats are initially emptied and are subsequently filled gradually in accordance with the manipulation of the accelerating drum AD.

Further regeneration may be effected after the speed has been reduced to substantially fourteen miles per hour by moving the speed drum SD to its position 7, whereby the motor connections are re-arranged for the seven miles per hour operating speed, after which the regenerative action may be utilized until the motor speed has been reduced to that corresponding to the synchronous speed of the motors in the position 7 of the speed drum.

Obviously, my invention is not restricted to the structural details and the specific arrangement and location of parts and circuit connections herein set forth, and many modifications therein may be effected without departing from the spirit and scope of my invention.

I claim as my invention:

1. In a control system, the combination with a source of energy, a plurality of polyphase motors, and means for connecting said motors to said source, of a plurality of switching devices for arranging the circuit connections of said motors for different ranges of operating speeds, and means for preventing the operation of said switching devices when said connecting means is in its closed position.

2. In a control system, the combination with a source of energy, a plurality of polyphase motors, and means for connecting said motors to said source, of a plurality of switching devices for arranging the circuit connections of said motors for different ranges of operating speeds, and electrical means dependent upon the positions of said connecting means for controlling the actuation of said switching devices.

3. In a control system, the combination with a source of energy, a plurality of polyphase motors, and means for connecting said motors to said source, of a plurality of electrically operated switching devices for arranging the circuit connections of said motors for different ranges of operating speeds, and auxiliary interlocking switches associated with said connecting means for preventing the operation of said switching devices when said connecting means is closed to supply energy to said motors.

4. In a control system, the combination with a source of energy, a plurality of polyphase motors, and means for connecting said motors to said source, of a plurality of electrically operated switching devices for arranging the circuit connections of said motors for different ranges of operating speeds, and means coöperating with said switching devices for preventing the actuation thereof when energy is supplied to said motors.

5. In a control system, the combination with a source of energy, a plurality of polyphase motors, and means for connecting said motors to said source, of a plurality of switching devices for changing the number of poles of said motors, and a switching device for connecting said motors in cascade or in parallel relation, whereby said motors are adapted for different ranges of operating speeds, electrical means for controlling and operating said switching devices, and interlocking means associated with said connecting means for preventing the actuation of said switching devices when said connecting means is closed to supply energy to said motors.

6. In a control system, the combination with a source of energy, a polyphase motor adapted to be connected for different numbers of poles, and means for connecting said motor to said source, of electrically operated pole-changing switching means for adjusting the pole connections of said motor, and means associated with said connecting means for preventing the operation of said pole-changing switching means when said connecting means is closed.

7. In a control system, the combination with a source of energy, a plurality of polyphase motors, and switching means for connecting said motors to said source, of an electrically operated switching device for arranging said motors in parallel or in cascade relation, and interlocking means associated with said switching means for preventing the actuation of said switching device when energy is supplied to said motors.

8. In a control system, the combination with a source of energy, a plurality of polyphase motors adapted to receive energy therefrom, and a plurality of switching devices for arranging the motors for different ranges of operating speeds, of means for governing the operation of said motors for each range of speed, and means for preventing the operation of said governing means until said switching devices occupy predetermined positions.

9. In a control system, the combination with a source of energy, a plurality of polyphase motors adapted to receive energy therefrom, and a plurality of switching devices for arranging the motors for different ranges of operating speeds, of means for governing the operation of said motors for each range of speed, and interlocking means associated with said switching devices for permitting the operation of said governing means only when said switching devices occupy predetermined positions.

10. In a control system, the combination with a source of energy, a plurality of polyphase motors adapted to receive energy therefrom, and a plurality of switching devices for arranging the motors for different ranges of operating speeds, of electrically controlled means for governing the acceleration of said motors throughout each speed range, and interlocking switches associated with said switching devices for preventing the operation of said acceleration governing means when said switching devices occupy improper positions.

11. In a control system, the combination with a source of energy, a plurality of polyphase motors adapted to receive energy therefrom, and a plurality of switching devices for arranging the motors for different ranges of operating speeds, of an electrically controlled liquid rheostat for governing the acceleration of said motors for each speed range and having a control circuit interlocked with certain positions of said switching devices, whereby said rheostat is operative only when said switching devices are in predetermined positions.

12. In a control system, the combination with a source of energy, a plurality of polyphase motors receiving energy therefrom, a plurality of pole-changing switches for adapting said motors for different numbers of poles, and another switch for connecting said motors in parallel or in cascade relation, whereby different ranges of operating speeds are obtained, of a plurality of rheostatic devices for governing the acceleration of said motors throughout each range of speeds, electrically controlled means for actuating said rheostatic devices, and interlocking means permitting the energization of said electrically controlled means only when said pole-changing switches and said cascade switch occupy predetermined relative positions.

13. In a control system, the combination with a source of energy, a plurality of polyphase motors receiving energy therefrom, a plurality of pole-changing switches for adapting said motors for different numbers of poles, whereby a plurality of ranges of operating speeds is obtained, and means for governing the acceleration of said motors for each range of speed, of means for rendering the operation of said governing means dependent upon predetermined positions of said pole-changing switches.

14. In a control system, the combination with a source of energy, a plurality of polyphase motors receiving energy therefrom, a plurality of pole-changing switches for adapting said motors for different numbers of poles, whereby a plurality of ranges of operating speeds is obtained, and means for governing the acceleration of said motors for each range of speed, of interlocking means associated with said pole-changing switches for permitting the operation of said acceleration governing means only when said switches occupy corresponding positions.

15. In a control system, the combination with a source of energy, a plurality of polyphase motors, and means for connecting said motors in cascade and in parallel relation for different speed ranges, of a plurality of rheostatic devices for governing the operation of said motors, and means for permitting the operation of only one rheostatic device when said motors are connected in cascade arrangement.

16. In a control system, the combination with a source of energy, a plurality of polyphase motors, and speed-changing means for connecting said motors in cascade and in parallel relation for different speed ranges, of a plurality of rheostatic devices for governing the operation of said motors, electrical means for controlling the operation of said rheostatic devices, and interlocking means associated with said speed-changing means and adapted to govern the action of said electrical controlling means for permitting the operation of both rheostatic devices when the motors are arranged in parallel and of only one rheostatic device when arranged in cascade.

17. In a control system, the combination with a source of energy, a plurality of polyphase motors, and means for connecting said motors in cascade and in parallel relation for different speed ranges, of a plurality of liquid rheostats for governing the acceleration of said motors and severally having electrically operated discharge valves, and means for preventing the actuation of one of said discharge valves when said motors are connected in cascade arrangement.

18. In a control system, the combination with a source of energy, a plurality of polyphase motors, and means for connecting said motors in cascade and in parallel relation for different speed ranges, of a plurality of liquid rheostats for severally governing the acceleration of said motors when connected in parallel, and means for preventing the operation of one rheostat when said motors are connected in cascade relation.

19. In a control system, the combination with a source of energy, a plurality of polyphase motors connected thereto, a switching device for connecting said motors in cascade and in parallel relation, and a plurality of switching devices for changing the number of poles of said motors, whereby different ranges of operating speeds are obtained, of a plurality of electrically controlled rheostatic devices for severally governing the acceleration of said motors, and interlocking means associated with said cascading switch for preventing the operation of one of said rheostatic devices when said motors are connected in cascade relation.

20. In a control system, the combination with a source of energy, a plurality of polyphase motors connected thereto, means for connecting said motors in parallel and in cascade relation, and a plurality of rheostatic devices for governing the acceleration of said motors, means for short-circuiting said rheostatic devices in their full operative positions, and means for preventing the short-circuiting means of one rheostatic device from operating when the motors are connected in cascade relation.

21. In a control system, the combination with a source of energy, a plurality of polyphase motors connected thereto, means for connecting said motors in parallel and in cascade relation, and a plurality of rheostatic devices for governing the acceleration of said motors, of means for short-circuiting said rheostatic devices in their full operative positions when the motors are connected in parallel, and means associated with said connecting means for preventing one of said short-circuiting means from acting when the motors are connected in cascade relation.

22. In a control system, the combination with a source of energy, a plurality of polyphase motors connected thereto, means for connecting said motors in parallel and in cascade relation, and a plurality of rheostatic devices for governing the acceleration of said motors, of means for short-circuiting said rheostatic devices, means for preventing the operation of said short-circuiting means until said rheostatic devices occupy their full operative positions, and means for preventing the short-circuiting means of one rheostatic device from acting when said motors are connected in cascade arrangement.

23. In a control system, the combination with a source of energy, an electric motor connected thereto, and a liquid rheostat for governing the operation of said motor and having a discharge valve and a regulating valve for fixing the height of the electrolyte, of means for preventing the actuation of said regulating valve until said discharge valve occupies a predetermined position.

24. In a control system, the combination with a source of energy, an electric motor connected thereto, and a liquid rheostat for governing the operation of said motor and having a discharge valve and a regulating valve for fixing the height of the electrolyte, of interlocking means associated with said discharge valve for permitting the operation of said regulating valve only when said discharge valve is closed.

25. In a control system, the combination with a source of energy, an electrical motor connected thereto, and a liquid rheostat for governing the operation of said motor and having a discharge valve and an electrically controlled regulating valve for fixing the height of the electrolyte and embodying a fluid-operated piston working within a cylinder having a plurality of electromagnetic valves normally adapted to admit operating fluid thereto to cause said regulating valve to be moved to its "off" position, of means for deënergizing said electromagnetic valves when said discharge valve is open to discharge electrolyte from said rheostat, whereby said regulating valve is returned to its "off" position.

26. In a control system, the combination with a source of energy, a polyphase induction motor connected thereto, and a switching device for arranging the motor connections for different ranges of operating speeds, of a liquid rheostat for governing the acceleration of said motor and embodying an electrically-operated discharge valve, a regulating valve adapted to fix the height of the electrolyte, and an electrically controlled device for actuating said valve, and means for preventing the operation of said electrically-controlled device until said discharge valve occupies its closed position.

27. In a control system, the combination with a source of energy, a polyphase induction motor, a switching device for connecting said motor to said source, and a liquid rheostat for governing the operation of said motor and embodying a regulating valve for fixing the height of the electrolyte, of means associated with said regulating valve for effecting the interruption of the motor circuits within said rheostat.

28. In a control system, the combination with a source of energy, a polyphase induction motor, and a switching device for connecting said motor to said source, of a rheostatic device for governing the acceleration of said motor, electrically controlled means associated with said rheostatic device for actuating said device, and interlocking means associated with said electrically controlled means for causing the interruption of the motor circuits to be effected by said rheostatic device.

29. In a control system, the combination with a source of energy, a polyphase induction motor, a switching device for connecting the motor to said source, and an electrically-controlled liquid rheostat for governing the acceleration of said motor and embodying a discharge valve and a regulating valve adapted to be raised and lowered to fix the height of the electrolyte, of an interlock switch associated with said rheostat and adapted to be actuated when said regulating valve is in its lowest position for maintaining said switching device closed until said regulating valve occupies its lowest position.

30. In a system of control, the combination with a source of energy, a plurality of polyphase induction motors, a plurality of electrically-operated switches for connecting said motors to said source of energy, and a plurality of speed-changing switches for arranging the motor connections for different ranges of operating speed, of a plurality of electrically controlled liquid rheostats for governing the acceleration of said motors and embodying discharge valves and regulating valves for raising and lowering the height of the electrolyte therein, and means associated with said rheostats and governing the operation of said line switches for causing the interruption of the motor circuits to occur within said rheostats when the transition from one speed to another is effected by said speed-changing switches.

31. In a control system, the combination with a source of energy, a plurality of polyphase induction motors, a plurality of electrically-operated line switches for connecting said motors to said source, and a plurality of switching devices for arranging the motor-circuit connections for parallel and for cascade operation, whereby different ranges of operating speeds are obtained, of a plurality of liquid rheostats severally having discharge valves and regulating valves adapted to be raised and lowered for fixing the height of the electrolyte, an electrically-controlled operating device for said regulating valves, means for controlling the operation of said operating device, and interlocking means actuated by said operating device for maintaining said line switches in their closed positions and permitting the interruption of the motor circuits to be effected within said rheostats when the transition between the different speed connections of said motors is effected.

32. In a control system, the combination with a source of energy, a polyphase induction motor adapted to be connected for a plurality of ranges of operating speeds, and liquid rheostats for governing the acceleration of said motor during each speed range, of line switching devices for connecting said motors to said source, and means for causing said liquid rheostats to interrupt the motor current during transitions in speed connections of said motors.

33. In a control system, the combination with a source of energy, a polyphase induction motor adapted to be connected for a plurality of ranges of operating speeds, and liquid rheostats for governing the acceleration of said motor during each speed range, of line switching devices for connecting said motors to said source, and means for causing said rheostats and said line switching devices to successively open the motor circuits.

34. In a control system, the combination with a source of energy, a polyphase induction motor, and a line switching device for connecting said motor to said source, of a liquid rheostat for governing the acceleration of said motor, and means for causing said line switching device to open subsequent to the interruption of the motor current by said rheostat.

35. In a system of control, the combination with a source of energy, a polyphase electric motor, an electrically-operated switching device for connecting said motor to said source, and a liquid rheostat for governing the operation of said motor and embodying a regulating valve adapted to be raised and lowered for fixing the height of the electrolyte, a discharge port and a discharge valve for opening and closing said discharge port, of electrically-controlled means for actuating said regulating valve, means associated with said discharge valve for effecting the closure of said line switches subsequent to the closure of said discharge valve and prior to the operation of said regulating valve operating means.

36. In a control system, the combination with a source of energy, a polyphase induction motor, electrically-operated line switches for connecting said motor to said source, a liquid rheostat for governing the operation of said motor and embodying a discharge valve for controlling the discharge of electrolyte from said rheostat, and an electrically-controlled regulating valve adapted to be raised and lowered for fixing the height of the electrolyte, of interlocking means associated with said discharge valve for effecting the closure of said line switches subsequent to the closure of said discharge valve, and other interlocking means associated with said discharge valve for delaying the operation of said regulating valve until said discharge valve is closed.

37. In a control system, the combination with a source of energy, a plurality of polyphase induction motors, electrically-operated switches for connecting said motors to said source, a plurality of liquid rheostats for governing the operation of said motors, and controllable means for governing the operation of said rheostats, of a plurality of electrically-operated speed-changing switches for arranging the motor connections for parallel and cascade operation, whereby different ranges of operating speeds are obtained, means associated with said controllable means for causing said line switches to interrupt the motor circuits when said means is moved to its off position, and means associated with said liquid rheostats for causing said rheostats to interrupt the motor circuits during the transition effected by said speed-changing switches.

38. In a control system, the combination with a source of energy, a plurality of polyphase electric motors, and a plurality of switching devices for connecting said motors to said source, of a plurality of speed-changing switches for connecting said motors in parallel and in cascade relation, and means for preventing the closure of one of said motor-connecting switching devices when said motors are connected in cascade relation.

39. In a control system, the combination with a source of energy, a plurality of polyphase induction motors, and a plurality of electrically-operated line switches for connecting said motors to said source, of a plurality of speed-changing switches for arranging the motor connections for parallel and cascade operation, and interlocking means associated with one of said speed-changing switches for preventing the closure of one set of motor line switches when said motors are connected in cascade relation.

40. In a system of control, the combination with a source of energy, and a plurality of polyphase induction motors adapted to be connected in parallel and in cascade relation, whereby a plurality of operating speeds are obtained, of interlocking means for preventing the closure of one set of line switches when said motors are connected in cascade arrangement.

41. In a system of control, the combination with a source of energy, a plurality of polyphase induction motors adapted to be connected for different numbers of poles, and a plurality of switching devices for arranging the motor connections for different numbers of poles and for connecting said motors in parallel and in cascade relation, of a plurality of line switches for connecting said motors to said source, and means for preventing the connection of one of said motors to said source when said motors are connected in cascade relation.

42. In a system of control, the combination with a source of energy, a plurality of polyphase induction motors, a plurality of switching devices for connecting said motors for different numbers of poles, and a switching device for arranging said motors in parallel and in cascade relation, of a plurality of electrically-operated line switches for connecting said motors to said source for connecting said motors to said source during parallel operation, and interlocking means associated with said cascade switching device for preventing the closure of one set of line switches when said motors are connected in cascade relation.

43. In a system of control, the combination with a source of energy, a plurality of polyphase induction motors adapted to be connected for different numbers of poles and in parallel and in cascade relation, and a plurality of switching devices for arranging the motor circuit connections in said relations, of a plurality of line switches adapted to connect said motors to said source, and means for precluding the closure of said line switches until said devices occupy their operative positions.

44. In a system of control, the combination with a source of energy, a plurality of motors, and a plurality of switching devices for arranging the motor connections for different numbers of poles and for parallel and cascade operation, of a plurality of electrically-operated line switches for connecting said motors to said source and interlocking means associated with said switching devices for preventing the closure of said line switches until said devices occupy their operative positions.

45. In a system of control, the combination with a source of energy, a plurality of polyphase induction motors, and a plurality of switching devices for connecting said motors for different numbers of poles, of a plurality of electrically-operated line switches for connecting said motors to said source and interlocking means associated with said switching devices for preventing the closure of said electrically-operated line switches until all of said switching devices occupy their operative positions.

46. In a system of control, the combination with a source of energy, a plurality of polyphase induction motors, and a plurality of electrically-operated line switches for connecting said motors to said source, of a plurality of switching devices for arranging the circuit connections of said motors for different numbers of poles, another switching device for connecting said motors in parallel and in cascade relation, and a plurality of interlocking means associated with said switching devices and adapted to govern the operation of said line switches, whereby said line switches can be closed only when said switching devices occupy predetermined positions.

47. In a system of control, the combination with a source of energy, a plurality of polyphase induction motors, and a plurality of line switches for connecting said motors to said source of energy, of a plurality of speed-changing switching devices for arranging the motor-circuit connections for different numbers of poles and for parallel and cascade operation, whereby different ranges of operating speeds are obtained, and a plurality of interlocking means associated with the several speed-changing switches for preventing the energization and closure of said line switches when said speed-changing switches are out of their operative positions.

48. In a system of control, the combination with a source of energy, a plurality of polyphase induction motors, a plurality of electrically-operated line switches for connecting said motors to said source, a plurality of speed-changing switches for connecting said motors for different ranges of operating speeds, and a plurality of liquid rheostats for governing the acceleration of said motors, of a master controller for controlling the operation of said speed-changing devices and said line switches, and a second master controller for controlling the operation of said liquid rheostats, said first controller being adapted to effect the interruption of said motor circuits through said line switches when moved to its off position, and said second controller being adapted to effect the interruption of said motor circuits through said liquid rheostats when moved to its off position.

49. In a system of control, the combination with a source of energy, a plurality of polyphase induction motors, a plurality of electrically controlled speed-changing devices for arranging said motors for different numbers of poles and for cascade and parallel operation, a plurality of electrically operated line switches for connecting said motors to said source, and a plurality of electrically controlled liquid rheostats for controlling the acceleration of said motors, of a master controller for controlling the operation of said speed-changing devices and said line switches, and a second master controller for controlling the operation of said liquid rheostats, said first master controller being adapted to cause said line switches to interrupt the motor circuits when said controller is moved to its off position, and said second master controller to cause said liquid rheostats to effect the interruption of said motor circuits when said controller is moved to its off position.

50. In a system of control, the combination with a source of energy, a plurality of polyphase induction motors, and a plurality of electrically operated speed-changing switches for arranging the motor connections for different ranges of speeds and each embodying an operating electromagnet for actuating its switch in one direction and a plurality of operating electromagnets for actuating its switch in the opposite direction, of controllable means for governing the energization of said electromagnets.

51. In a system of control, the combination with a source of energy, a plurality of polyphase induction motors, and a plurality of electrically operated speed-changing switches for arranging the motor connections for different ranges of speeds, and each embodying an operating electromagnet for actuating its switch in one direction and a plurality of operating electromagnets for actuating its switch in the opposite direction, of a master controller for energizing corresponding operating electromagnets associated with each of said speed-changing switches for effecting the transitions from one motor-speed connection to another.

52. In a system of control, the combination with a source of energy, a plurality of polyphase induction motors, and a plurality of electrically operated speed-changing switches for arranging the motor connections for different ranges of speeds and each embodying an operating electromagnet for actuating its switch in one direction and a plurality of operating electromagnets for actuating its switch in the opposite direction, of a master controller and as many control circuits as there are electromagnets for each speed-changing switch for concurrently energizing corresponding electromagnets associated with the several switches for actuating said switches from one position to another to effect transitions of speed connections.

53. In a system of control, the combination with a source of energy, a plurality of polyphase induction motors, and a plurality of electrically operated speed-changing switches for arranging the motor connections for different ranges of speeds and each embodying an operating electromagnet for actuating its switch in one direction and a plurality of operating electromagnets for actuating its switch in the opposite direction, of interlocking means associated with the several speed-changing switches for arranging the energizing circuits of said operating electromagnets in accordance with the relative positions of said speed-changing switches, and controllable means for governing the energization of said electromagnets.

54. In a system of control, the combination with a source of energy, a plurality of polyphase induction motors, and a plurality of electrically operated speed-changing switches for arranging the motor connections for different ranges of speeds and each embodying an operating electromagnet for actuating its switch in one direction and a plurality of operating electromagnets for actuating its switch in the opposite direction, of a controller having a plurality of operative positions for severally energizing corresponding electromagnets of each speed-changing switch, and interlocking means associated with said speed-changing switches for arranging the circuits of the electromagnets to be energized in accordance with the positions of said speed-changing switches.

55. In a system of control, the combination with a source of energy, a plurality of polyphase induction motors, and a plurality of electrically operated speed-changing switches for arranging the motor connections for different ranges of speeds and each embodying an operating electromagnet for actuating its switch in one direction and a plurality of operating electromagnets for actuating its switch in the opposite direction, of controllable means for governing the energization of said operating electromagnets, and means for insuring their energization in a predetermined sequence.

56. In a control system, the combination with a source of energy and a polyphase induction motor connected thereto, of a liquid rheostat for governing the acceleration of said motor and embodying a regulating valve adapted to fix the height of the electrolyte and an electrically controlled device for actuating said valve, and means directly dependent upon the attainment of a predetermined position by said valve for effecting the short-circuiting of said rheostat.

57. In a control system, the combination with a source of energy, a plurality of electric motors, and means for connecting said motors to said source, of a plurality of switching devices for arranging the circuit connections of said motors for different ranges of operating speeds, and means for preventing the operation of said switching devices when said connecting means occupies a predetermined position.

58. In a control system, the combination with a source of energy, an electric motor connected thereto, and a liquid rheostat for governing the operation of said motor and having a discharge valve and a regulating valve for fixing the height of the electrolyte, of means for preventing the actuation of one of said valves until the other valve occupies a predetermined position.

59. In a control system, the combination with a source of energy, an electric motor, means for connecting the motor to said source, and a liquid rheostat for governing the operation of said motor, of means for insuring the interruption of the motor circuits within said rheostat prior to the opening of said connecting means.

In testimony whereof, I have hereunto subscribed my name this 25th day of Aug., 1914.

ARTHUR J. HALL.

Witnesses:
EARL M. BILL,
B. B. HINES.

Copies of this patent may be obtained for five cents each, by addressing the "Commissioner of Patents, Washington, D. C."